March 10, 1970     K. H. STIENEN     3,499,553
STORAGE SYSTEM FOR MOTOR VEHICLES OR OTHER GOODS
Filed Jan. 22, 1968     3 Sheets-Sheet 1
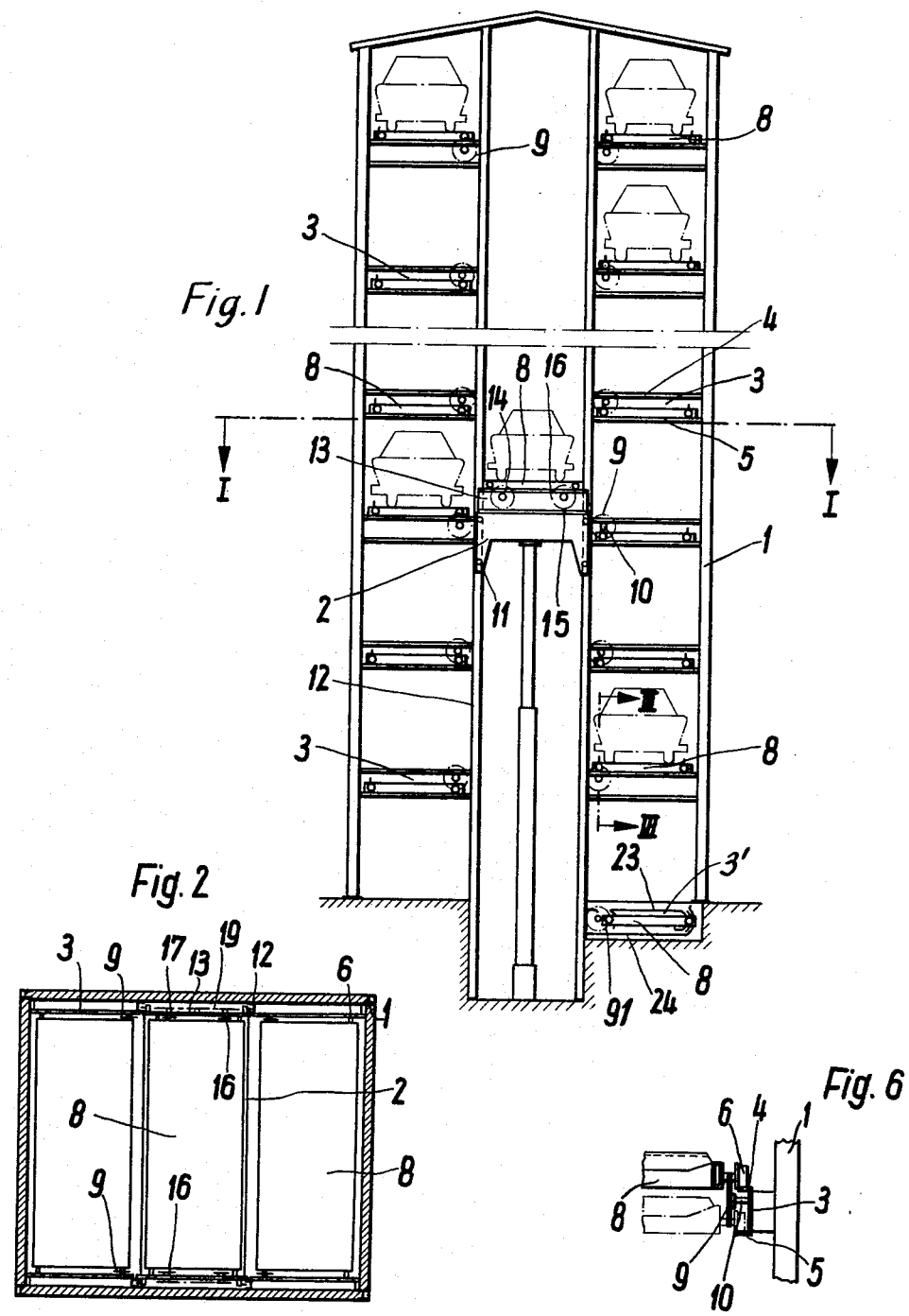
Inventor:
KARL HEINZ STIENEN
BY Rupert J. Brady
ATTORNEY

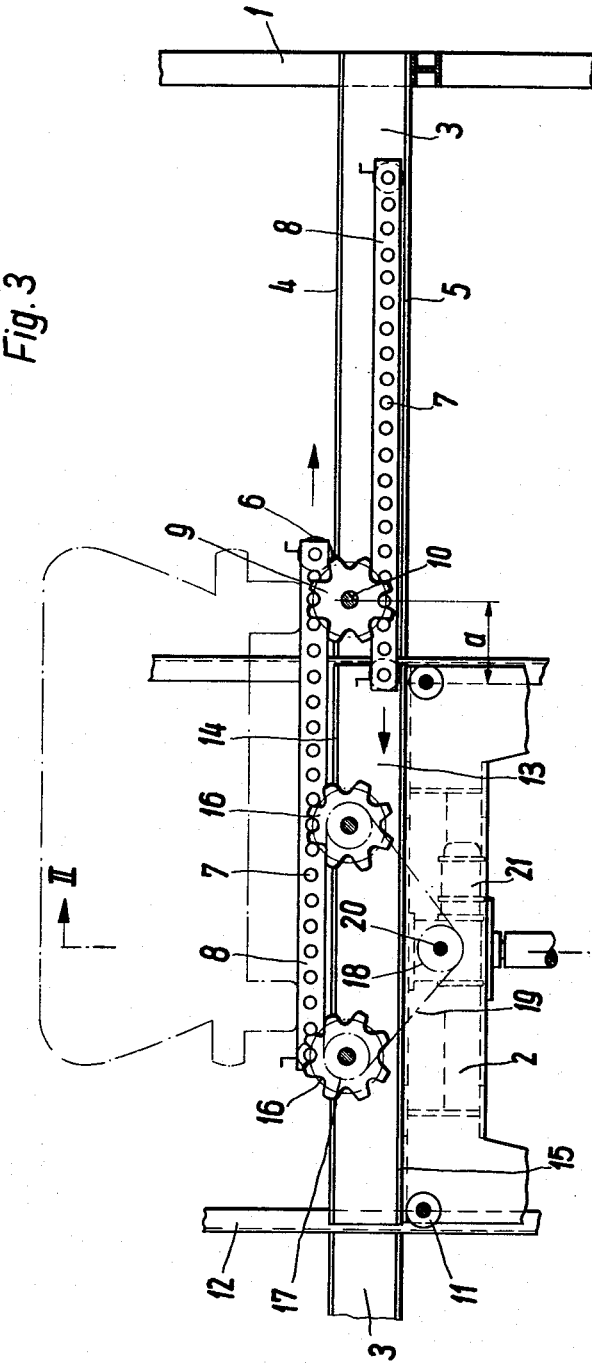
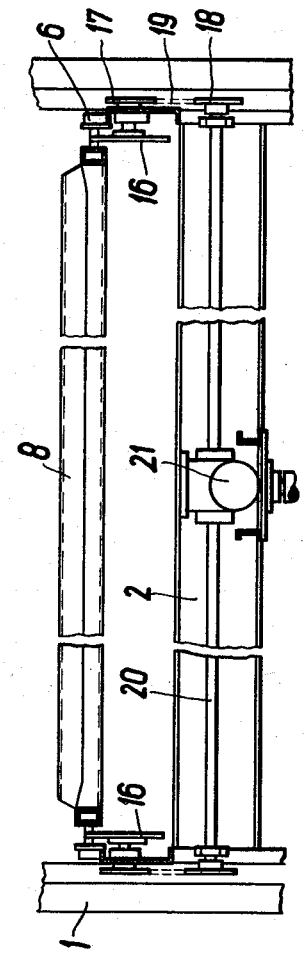

Inventor:
KARL HEINZ STIENEN

United States Patent Office 3,499,553
Patented Mar. 10, 1970

3,499,553
STORAGE SYSTEM FOR MOTOR VEHICLES
OR OTHER GOODS
Karl Heinz Stienen, Boll-Sinneringen, Bern, Switzerland
Filed Jan. 22, 1968, Ser. No. 699,478
Claims priority, application Switzerland, Jan. 23, 1967,
900/67
Int. Cl. E04h 6/22
U.S. Cl. 214—16.1          6 Claims

ABSTRACT OF THE DISCLOSURE

A storage system for motor vehicles or other goods has an elevator for conveying support platforms to and from a plurality of storeys, the support platforms running on upper flanges of rails at the storeys and on the elevator when loaded and on lower flanges of the rails when unloaded, and gears engageable in toothed racks on the support platforms for transferring loaded and unloaded support platforms in different directions between the elevator and any of the storeys.

---

The present invention relates to a storage system for motor vehicles or other goods, in which support platforms are provided on a plurality of storeys, and an elevator is provided for conveying the support platforms to and from the storeys, the elevator being provided with drive means for moving the support platforms from the elevator to the storeys and vice versa.

In one previously proposed system, empty support platforms are stored adjacent the elevator, at or below a drive-in level, at which position they are received by the elevator or delivered thereby, depending on whether a collection or storage procedure is in progress, in order to enable the elevator to provide at all times a support platform, ready for the reception of a vehicle or the like. Such platform stores occupy considerable space and require a complicated control arrangement.

In another previously proposed system so-called double storeys are provided and a loaded support platform, disposed above an empty support platform, is pushed on to the storey whereupon lifting means on the elevator are lowered and the empty support platform is drawn into the elevator. In this system extensive periods of time are required for a storing procedure or a collecting procedure and a large mechanical effort is also needed.

It is an object of the present invention to provide a system in which a storing or collecting procedure can take place in a short time, in which a support platform is available at all times on the elevator wtihout the need for storing empty platforms and which has a simple construction.

According to the invention, a storage system for motor vehicles or other goods comprises support platforms provided on a plurality of storeys and an elevator for conveying the support platforms to and from the storeys, the elevator being provided with drive means for moving the support platforms from the elevator to the storeys and vice versa, wherein at each storey rails are provided having upper and lower flanges, similar rails being provided on the elevator, the arrangement being such that the support platforms run upon the upper flanges when loaded and on the lower flanges when unloaded, the support platforms being provided with toothed racks, gears disposed between the flanges, driven gears being provided on the elevators, the gears being arranged to mesh with the toothed racks of the support platforms for transferring loaded and unloaded support platforms in opposite directions between the elevator and the rails at any of the storeys.

Figure 7:
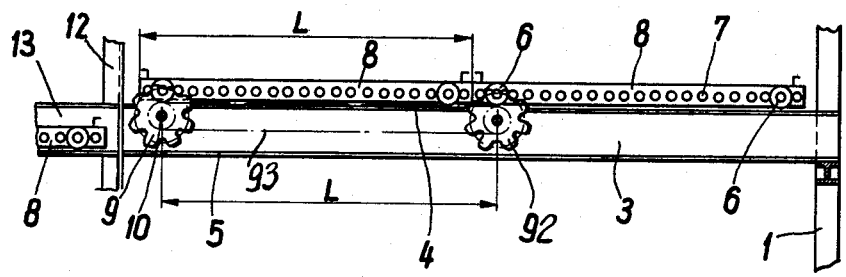
Figure 5:
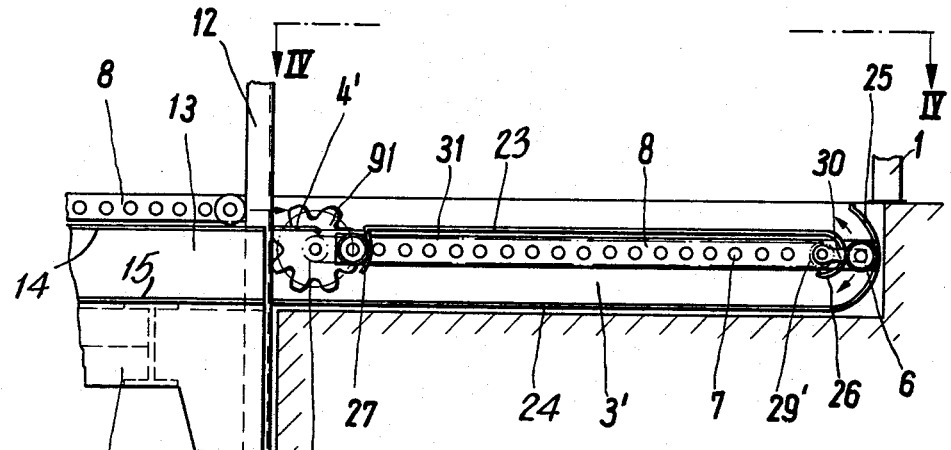
Figure 8:
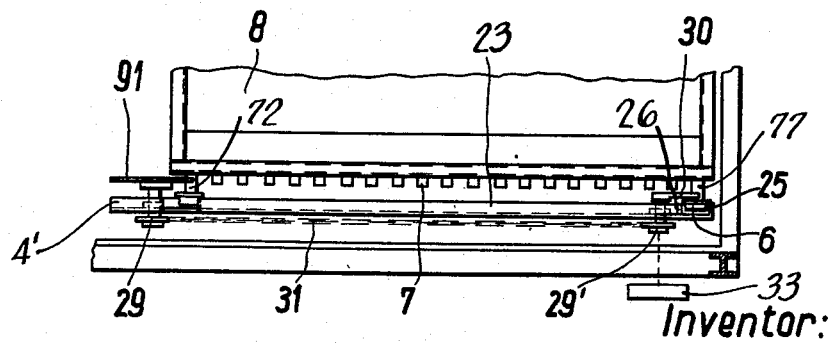

The invention will be more readily understood from the description of an embodiment thereof given by way of example hereinafter with reference to the accompanying drawings; in which:

FIG. 1 is a vertical section through a system for storing motor vehicles;
FIG. 2 is a horizontal section along the line I—I of FIG. 1;
FIG. 3 shows details of means for horizontal displacement of support platforms to and from the elevator;
FIG. 4 shows a section along the line II—II of FIG. 3;
FIG. 5 shows a partial side view of a support platform storey at the drive-in level;
FIG. 6 shows a section along the line III—III of FIG. 1;
FIG. 7 shows a storey with two adjacently disposed support platforms; and
FIG. 8 shows a section along the line IV—IV of FIG. 5.

In the embodiment illustrated in FIG. 1 the system comprises a supporting structure 1 of steel or ferroconcrete, having an elevator shaft in the middle in which an elevator platform 2 is operated by known means, for example hydraulic jacks.

Rails 3 with flanges 4 and 5 are disposed on the lefthand and right-hand side of the elevator shaft at each storey. Support platforms 8, provided with track wheels 6 and toothed racks 7 bear upon the rails 3, each platform bearing on the upper flanges 4 when loaded and on the lower flanges 5 when empty. At each storey, gears 9 are journalled on fixed shafts 10, extending from rails 3, at a distance $a$ from the elevator shaft and disposed between the flanges 4 and 5 of the rails 3, the gears 9 being provided on both sides of the support platform 8 and adapted to engage either from above in the toothed racks 7 of the support platform 8 when the latter is disposed on the lower flanges 5 or from below in the racks 7 of the support platform 8 when the latter is disposed on the upper flanges 4. The toothed racks 7 each comprise a plurality of bolts and constitutes a so-called transmission rack.

The elevator platform 2 is guided vertically by means of rollers 11 in vertical guide rails 12 and is provided on its upper surface with rails 13 having flanges 14 and 15, the rails 13 being identical to the rails 3 with the flanges 4 and 5, and being disposed at the same level as and in registration with the rails 3, 4 and 5 when the elevator platform stops at a storey. Two gears 16 are disposed between the flanges 14 and 15 of each rail 13 and the support platform 8, when loaded, is carried by track wheels 6 on the upper flanges 14 of the pair of rails 13 with the gears 16 meshing from below with the toothed racks 7 on each side of platform 8, or when unloaded the platform 8 is carried on the lower flanges 15 with the gears 16 meshing from above with the racks 7 thereon.

The gears 16 are driven by a drive motor 21 on the elevator platform 2 via sprockets 17 and 18, a chain 19 and a shaft 20, FIGS. 3 and 4.

At the drive-in level shown in FIG. 5, the flanges 4 and 5 of the rails 3 are curved to an arcuate shape at ends 25 and 26 away from the elevator shaft, and curved flanges 27 are provided on the ends of flanges 4 toward the elevator shaft. The flanges 4 and 5 are disposed at the same level as the flanges 14 and 15 of the rails 13 on the elevator platform when the latter is in its drive-in position.

The gears 91, at this drive-in levels, which are comparable to gears 9 at the other levels, are supported by shafts which are coupled to the sprockets 29, and which are journaled on rails 3' on each end of the drive-in level in the same manner as on the parking storeys. Transfer levers 30, are pivotally connected to rails 3' at the center of curvature of curved flanges 25 and 26, and are coupled to the sprockets 29' for movement thereby. The sprockets 29 and 29' are coupled by endless chains 31, on each end of the level, to provide driving coupling between the gears 91 and the levers 30.

The support platform 8 is moved horizontally until the track wheels 6 at the leading end of the support platform enter the curved flanges 25, 26. At this position, the transfer levers 30, which have notches on the ends thereof, engage the shafts 71 of the track wheels 6 and at the same time, on the opposite end of the support platform, the last bolts of the toothed racks 7 and the track wheel shafts 72 mesh with the pinions 91.

Since the transfer levers 30 are transmission coupled to gears 91 by sprockets 29, 29' and chains 31, the levers 30 are rotated from the horizontal neutral or rest position, as shown in FIG. 5, by the action of gears 91 during insertion or removal of a support platform 8, which causes the support platform at the drive-in level to be raised or lowered from the neutral position shown. There is always a support platform 8 at this drive-in level. When being raised or lowered from the neutral position the track wheels 6 on one end of the support platform pass between arcuate guide flanges 25 and 26 and at the opposite end are urged by gears 91 into guiding contact with curved flanges 27. In the neutral position, the support platform is supported by means of brakes 33, e.g. electro magnetic brakes, disposed on the shaft of the levers 30. The support platform can be upwardly pivoted from its neutral position and may be pivoted on to the upper flanges 23 or it may be downwardly pivoted and conveyed to the lower flanges 24 of the rails 3' from where it can run on to the rails 13 of the elevator platform.

The procedure for parking and collection of vehicles is as follows:

With the elevator platform 2 lowered to the drive-in level, a vehicle to be parked drives under its own power on to the support platform 8, which is disposed on the elevator platform and supported on the upper flanges 14 of rails 13 thereon. The vehicle is disposed in alignment with the longitudinal axis of platform 8. An instruction is given by known electrical circuit means to cause the elevator to move vertically to a parking storey. After the elevator has stopped so that its rails 13 are in registration with rails 3, the drive motor 21 is energised to drive the gears 16, which move the support platform 8 laterally via the toothed racks 7 onto the empty upper flanges 4 of rails 3.

After moving through a short distance, the toothed racks 7 engage with the gears 9, at the parking storey, which in turn mesh with the toothed racks 7 of an empty support platform disposed on the lower flanges 5 at the parking storey. Since the laden support platform continues to be moved horizontally by driven gears 16, the gears 9 will rotate to push the empty support platform in the opposite direction on to the lower flanges 15 of the rails 13 and thus on to the elevator platform.

Before the toothed racks 7 of the laden support platform 8 disengage the driven gears 16, the toothed racks of the empty support platform 8 engage the driven gears 16, so that the lower empty support platform then drives the gears 9 and the laden support platform is moved fully on to the rails 3 at the parking storey as the empty support platform is pulled by gears 16 fully onto the elevator platform.

When the laden support platform reaches its final position the toothed racks 7 of the empty support platform disengage the gears 9. The empty support platform is then disposed by the driven gears 16 accurately in the centre of the elevator platform, after which the gear motor 21 is switched off by known switching means and the elevator together with the empty support platform, disposed on the lower flanges 15 of the rails 13, is lowered to the drive-in level.

The elevator is then ready for a vehicle collection procedure, for which an empty support platform is required on the lower flanges of the rails 13. The principal of the collection procedure is identical with that of the parking procedure except that the empty support platform moves on the lower flanges 15 of the rails 13 of the elevator onto the lower flanges 5 of the rails 3 of the parking storey and the laden support platform is simultaneously conveyed in the opposite direction along flanges 4 onto the upper flanges 14 of the elevator platform. However, with the elevator at the drive-in level, if the next vehicle is required to be parked, instead of being collected as outlined above, the gear motor 21 is switched on and the empty support platform on the lower flanges 15 is pushed by gears 16 from the rails 13 of the elevator platform at the drive-in level (FIG. 5) in the manner already described for parking. The empty support platform 8 is traveresd onto the lower flanges 24 of rails 3' at the drive-in level and its toothed racks 7 mesh with the gears 91. Meshing of the toothed racks 7 of the empty support platform with the gears 91 causes the gears 91, together with their transmission coupled transfer levers 30, to be driven counterclockwise, as shown in FIG. 5, and the other empty support platform 8 which is in its neutral position at the drive-in level is pivoted upwardly onto the upper flanges 4, 23 of rails 3', and then pushed onto the upper flanges 14 of rails 13 of the elevator platform while rolling upon the upper flanges 4', 23 and 14. The empty support platform 8 moved from the lower flanges of the elevator automatically assumes the neutral position at the drive-in level, as shown in FIG. 5.

By this procedure a support platform, ready for a motor vehicle to be parked, will then be disposed on the upper flanges 14 of the rails 13 on the elevator. The vehicle will then be driven onto the support platform 8 on the elevator.

To accelerate loading or unloading of the storage system it is possible, as a modification of the preferred system, for the support platform 8 disposed in the neutral position at the drive-in level to serve as a drive-out and drive-in platform, the drive-in level for this purpose then being constructed with a slight downward gradient and with measures, not shown, being adopted to facilitate driving over the upper flanges 23. When a plurality of vehicles are being collected from the storage system, a support platform with the motor vehicle thereon is pushed from the upper flanges of the elevator at the drive-in level, onto the upper flanges 4', 23 of rails 3', where an empty support platform is simultaneously moved from the neutral position onto flanges 24 and then pushed by clockwise rotation of gear 91 onto the lower flanges 15 of the elevator, and while the motor vehicle is driven under its own power from the support platform, while it is in the neutral position, FIG. 5, at the drive-in level, the elevator can collect the next motor vehicle from a parking storey. When a plurality of vehicles are being parked, with the mentioned modification, the first motor vehicle drives onto the support platform 8 in the neutral position at the drive-in level. The loaded support platform is then raised and conveyed to the left onto the upper flanges 14 of the elevator by counterclockwise rotation of mebers 16, 91, 29, 31, 29', 30, while at the same time an empty support platform is moved from the elevator onto the lower flanges 24 of the drive-in level and then up to the neutral position of FIG. 5. During the time in which the laden support platform is moved by the elevator to a parking storey, the next vehicle may be driven onto the support platform positioned at readiness in the neutral position at the drive-in level.

In order to provide a large parking area on the smallest possible ground area, as shown in FIG. 7, it is possible for two support platforms 8 to be disposed adjacently on the parking storeys on each side of the elevator shaft. In this embodiment, two gears 9 and 92, instead of one gear as in the preferred form, transmission coupled to each other by separate and endless chains 83, are provided at a spacing corresponding to the length of a support platform. Movement of the support platforms 8 on the rails 3 and exchanging of laden platforms for empty platforms or vice versa proceeds in the same manner as in the embodiment with one support platform at each side of the elevator shaft at each storey.

It is also possible to provide an arrangement in which a plurality of parking systems are disposed behind one another and the elevator is movable in the travelling direction of the vehicles to enable parking storeys disposed behind one another to be used.

The above description of the method of operation of the systems embodying the invention illustrates that very rapid parking and collection of motor vehicles is possible without substantial expenditure.

It is obvious that the system can also be employed for storing goods of all kinds, in particular voluminous goods such as containers.

I claim:

1. A storage system for motor vehicles, comprising in combination a storage structure having a plurality of parking levels and an entrance level; at least a first pair of rails on each of said parking levels; an elevator shaft extending through said parking levels, an elevator having an elevator platform connected for movement in said shaft to a rest position at the entrance level and each parking level, a second pair of rails on said elevator platform; said second pair of rails connected for alignment with the first pair of rails of the respective parking level in the rest position of the elevator at the respective parking level, a third pair of rails mounted at the entrance level and adapted for alignment with said second pair of rails when the elevator platform moves to a rest position at the entrance level; a plurality of support platforms each for supporting one motor vehicle and provided with rollers for movement on said first, second and third pairs of rails; each support platform having a pair of rack means along the sides thereof extending in the direction of movement; upper running flanges on said first and second pairs of rails for the rollers of said support platforms when supporting a vehicle; lower running flanges on said first and second pairs of rails for the rollers of said support platforms when not carrying a vehicle; driving gear means on said second pair of rails adjacent at least one end thereof for meshing above with the pair of rack means of a support platform on said upper flanges and for meshing below with the pair of rack means of a support platform on said lower flanges of said second pair of rails; driving means on said elevator for rotating said driving gear means; a pair of free rotating gears on each of said first pair of rails and arranged adjacent to the elevator shaft for meshing above with the pair of rack means of a support platform on said upper flanges and for meshing below with the pair of rack means of a support platform on the lower flanges of the first pair of rails to move one of these support platforms in one direction between the aligned first and second pairs of rails when the other support platform is moved on these rails by said driving gear means in the opposite direction; upper flanges and lower flanges on said third pair of rails for said rollers of said support platforms, means connected on the third pair of rails at the entrance level and adapted to be operatively connected with said driving means on said elevator for moving a support platform from the upper to the lower flanges of said third pair of rails and vice versa; and said support platforms in the rest position of the storage system are situated one on each first pair of rails and one on said second pair of rails, on the upper flanges thereof when supporting a vehicle and on the lower flanges thereof when empty and one support platform on said third pair of rails.

2. A storage system as set forth in claim 1, wherein said rack means on said support platform are stub-toothed racks situated inwardly from said rollers; one of said stubs at one end of each rack projects beyond the other stubs; and in which said means connected on the third pair of rails includes a pair of further gears arranged adjacent the end of said third pair of rails adjacent to the elevator shaft, at the other end of said third pair of rails said upper flanges extending downwardly and said lower flanges extending upwardly providing semicircular paths for guiding a pair of rollers of a supporting platform from the upper flanges to the lower flanges of said third pair of rails and vice versa; the upper flanges of said third pair of rails having a gap therein on the side of the said further gears away from the elevator shaft for passing a pair of rollers of a supporting platform through this gap from the upper to the lower flanges and vice versa; a lever pivoted about an axis on each rail of said rail of said third pair of rails coaxial with the semicircular ends of said upper and lower flanges; means interconnecting said levers and said further gears whereby said levers are synchronously driven by said further gears; and said levers arranged for engaging the projecting outer ends of said one of said stubs at said one end of the racks when the further gears engage the outermost stubs on the other ends of the racks.

3. A storage system as set forth in claim 1, wherein said first pairs of rails have a length of twice the width of said supporting platform, a pair of second gears arranged on said first pair of rails spaced from said free rotating gears by a distance corresponding to the width of said supporting platform, and interconnecting means between said free rotating gears and said second gears whereby said second gears are positively driven by said free rotating gears.

4. A storage system as set forth in claim 2 wherein in the rest position of the storage system, said levers are in a horizontal position supporting together with said further gears said support platform situated at said third pair of rails in a horizontal position.

5. A storage system as set forth in claim 3 including two of said support platforms disposed in side-by-side relation on each of said first, second and third pairs of rails.

6. A storage system as set forth in claim 1 wherein said driving means on said elevator is operative, when said second and third pairs of rails are aligned, to move the support platform on said second pair of rails onto said third pair of rails into operative connection with said means and operating said means to simultaneously move the support platform on said third pair of rails between the upper and lower flanges thereof and in the opposite direction onto said second pair of rails and vice versa.

References Cited

UNITED STATES PATENTS

| | | |
|---|---|---|
| 1,931,402 | 10/1933 | Black. |
| 2,412,009 | 12/1946 | Rickland. |
| 2,856,081 | 10/1958 | Zaha. |
| 3,061,120 | 10/1962 | Barnett. |

FOREIGN PATENTS

| | | |
|---|---|---|
| 1,287,189 | 1/1962 | France. |
| 1,213,350 | 3/1966 | Germany. |
| 529,360 | 6/1955 | Italy. |

GERALD M. FORLENZA, Primary Examiner

R. B. JOHNSON, Assistant Examiner